US008874082B2

(12) United States Patent
Jha et al.

(10) Patent No.: US 8,874,082 B2
(45) Date of Patent: Oct. 28, 2014

(54) APPARATUS AND METHODS FOR PROTECTING DATA ON A WIRELESS DEVICE

(75) Inventors: Sanjay K. Jha, San Diego, CA (US); Behrooz L. Abdi, Carlsbad, CA (US); Clifton Eugene Scott, San Diego, CA (US); Kenny Fok, San Diego, CA (US); Eric Chi Chung Yip, San Diego, CA (US); Tia Manning Cassett, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1506 days.

(21) Appl. No.: 11/438,658

(22) Filed: May 19, 2006

(65) Prior Publication Data

US 2006/0293029 A1  Dec. 28, 2006

Related U.S. Application Data

(60) Provisional application No. 60/684,719, filed on May 25, 2005.

(51) Int. Cl.
| H04M 1/66 | (2006.01) |
| H04M 1/725 | (2006.01) |
| H04M 3/42 | (2006.01) |
| H04W 88/02 | (2009.01) |
| H04W 12/08 | (2009.01) |

(52) U.S. Cl.
CPC .......... *H04W 88/02* (2013.01); *H04M 1/72522* (2013.01); *H04M 3/42178* (2013.01); *H04W 12/08* (2013.01); *H04M 1/66* (2013.01)
USPC ........... 455/411; 455/410; 455/418; 455/419; 455/420; 455/425; 713/150; 713/152; 713/164; 713/182; 713/202

(58) Field of Classification Search
CPC .. H04M 1/66–1/68; H04L 9/00; H04L 63/08; H04W 12/06; H04W 12/12
USPC .............. 455/411, 410, 558, 414.1, 418–420, 455/425; 713/202, 150–152, 164–167, 713/182–185
See application file for complete search history.

(56) References Cited

U.S. PATENT DOCUMENTS

| 4,907,268 A | 3/1990 | Bosen et al. |
| 5,560,008 A | 9/1996 | Johnson et al. |

(Continued)

FOREIGN PATENT DOCUMENTS

| EP | 1170969 A1 | 1/2002 |
| EP | 1463369 A2 | 9/2004 |

(Continued)

OTHER PUBLICATIONS

International Search Report and Written Opinion—PCT/US2006/020641, International Search Authority—European Patent Office—Dec. 22, 2006.

(Continued)

*Primary Examiner* — Michael T Vu
(74) *Attorney, Agent, or Firm* — Won Tae Kim

(57) ABSTRACT

Apparatus, methods, and programs for protecting data on a wireless device may include a wireless device having a computer platform with a processing engine operable, based upon configurable parameters, to log data access attempt on the wireless device and transmit the log to a remote device. Furthermore, the wireless device may be configured to execute locally and remotely generated control commands on the wireless device, the commands operable to modify an operation of the wireless device. The embodiment may also include an apparatus operable to receive the transmitted log, analyze the received log and transmit a control command to the wireless device. The apparatus may further generate a data access report and make the report available to an authorized user.

30 Claims, 10 Drawing Sheets

(56) References Cited

U.S. PATENT DOCUMENTS

| | | | |
|---|---|---|---|
| 5,826,265 A | 10/1998 | Van Huben et al. | |
| 5,864,757 A * | 1/1999 | Parker | 455/418 |
| 5,974,311 A * | 10/1999 | Lipsit | 455/418 |
| 6,094,654 A | 7/2000 | Van Huben et al. | |
| 6,192,408 B1 | 2/2001 | Vahalia et al. | |
| 6,466,804 B1 * | 10/2002 | Pecen et al. | 455/558 |
| 6,816,891 B1 | 11/2004 | Vahalia et al. | |
| 7,059,903 B2 | 6/2006 | Sasaki et al. | |
| 7,110,751 B1 * | 9/2006 | Overby | 455/418 |
| 8,166,530 B2 * | 4/2012 | Adams et al. | 726/9 |
| 2004/0064742 A1 * | 4/2004 | Excoffier et al. | 713/202 |
| 2005/0053241 A1 * | 3/2005 | Fan et al. | 380/270 |
| 2005/0138390 A1 * | 6/2005 | Adams et al. | 713/185 |
| 2005/0197099 A1 * | 9/2005 | Nehushtan | 455/410 |
| 2006/0053306 A1 * | 3/2006 | Adams et al. | 713/190 |
| 2006/0183462 A1 * | 8/2006 | Kolehmainen | 455/411 |
| 2007/0117551 A1 * | 5/2007 | Boris et al. | 455/414.1 |

FOREIGN PATENT DOCUMENTS

| | | |
|---|---|---|
| EP | 1467275 A2 | 10/2004 |
| JP | 10512074 | 11/1998 |

OTHER PUBLICATIONS

ROC Taiwanese Search report—095131149—TIPO—Jun. 21, 2009.

* cited by examiner

APPARATUS AND METHODS FOR PROTECTING DATA ON A WIRELESS DEVICE

CLAIM OF PRIORITY UNDER 35 U.S.C. §119

The present Application for Patent claims priority to Provisional Application No. 60/684,719 entitled "Methods and Apparatus for Disabling Service on a Wireless Device," filed May 25, 2005, assigned to the assignee hereof and hereby expressly incorporated by reference herein.

BACKGROUND

The described embodiments generally relate to wireless communications devices and computer networks. More particularly, the described embodiments relate to apparatus and methods for protecting data on a wireless device.

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network.

These wireless devices generally contain software implemented locks that protect certain types of stored data, such as service programming locks (SPL) that restrict access to service programming data. For example, service programming data may include the account information of the user of the wireless device that allows the device to access a particular wireless network associated with a particular network service provider.

There are many reasons to protect data on a wireless device. For example, a network service provider may use a service programming lock so that the wireless device can only be used on their particular wireless network. For instance, in one scenario, a user may purchase a wireless handset and a service contract for cellular services from a network service provider, where the wireless handset is sold at a discount based on the service contract. In this case, the network provider subsidizes a portion of the handset cost for the purposes of marketing the service. If the user were able to unlock the SPL and reprogram the handset to use it on another network, the original network provider would lose the recurring income stream of the service that reimburses the network provider for subsidizing the cost of the handset.

Although locks may prevent a user from reprogramming the wireless device, or may prevent unauthorized access to protected data, unfettered access to a lock may allow repeated access attempts to eventually succeed.

Accordingly, it would be advantageous to provide an apparatus and method that allows for the monitoring and/or management of data access attempt occurring on a wireless device.

SUMMARY

The described embodiments comprise apparatus, methods, computer readable media and processors operable to protect data on a wireless device based upon a flexible data monitoring and lock management configuration. Disclosed methods and apparatus may detect unauthorized data access attempt that may initiate the generation and transmission of control commands supplied by at least one of a network service provider, wireless device manufacturer and other authorizing parties. Such control commands may be operable to disable non-emergency wireless device functionality to protect sensitive data, such as service provider operational data, so that network disruption and/or lost revenue is minimized.

In one aspect, a wireless communication device may comprise a memory including protected data and a monitoring and lock management configuration and a lock management engine resident in the memory and operable to monitor a protected data access attempt and record data access information based upon execution of the monitoring and lock management configuration.

In another aspect, a method of protecting data on a wireless device may comprise receiving on a wireless device a monitoring and lock management configuration operable to configure the wireless device to monitor protected data stored thereon. The method may further comprise collecting data access information based on an execution of the configuration on the wireless device and transmitting the collected data access information to another device to determine whether or not the data access is authorized.

Additional aspects may include a wireless device having means for performing the above disclosed operations, a processor configured to perform the above disclosed operations, and a computer-readable medium including one or more sets of instructions stored thereon for performing the above disclosed operations.

Another aspect of a method of protecting data on a wireless device may comprise receiving data access information from a wireless device based on execution of a monitoring and lock management configuration by the wireless device. The method may include analyzing the received data access information based upon a predetermined standard and transmitting a control command to the wireless device. Furthermore, the control command may be operable to change a predetermined operational functionality of the wireless device based on the analysis.

Additional aspects may include a computer program resident in a computer readable medium that, when executed, directs a computer device to perform the above actions as well as a data manager module comprising means to perform the above actions.

Still further, another aspect of an apparatus for protecting data on, a wireless device may comprise a processor and a data manager module executable by the processor. The data manager may further comprise an information repository operable to receive and store data access information collected from the wireless device based upon execution on the wireless device of a monitoring and lock management configuration, and an analyzer operable to generate a data access report based on the access information.

In addition, the data manager may further comprise a remote device control module operable to transmit a control command to the wireless device, wherein the control command is operable to generate and send a control command to change an operational characteristic of the wireless device based on at least one of the data access report and the access information.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

The apparatus, methods, computer readable media and processors discussed herein relate to the programmable monitoring, detecting and recording of attempts to access protected data on a wireless device. The disclosed embodiments further analyze the recorded information in order to reactively and/or proactively manage protected data and/or the programmable locks placed thereon to maintain the security and/or integrity of the protected data. For example, the protected data may define a functional and/or operational capability of the wireless device. As such, these apparatus, methods, computer readable media and processors may be desirable to thwart attempts to reprogram the functional and/or operational data to change a performance of the wireless device, such as to cause a malfunction of the device or its associated network and/or such as to provide the device with unauthorized capabilities.

Figure 1:
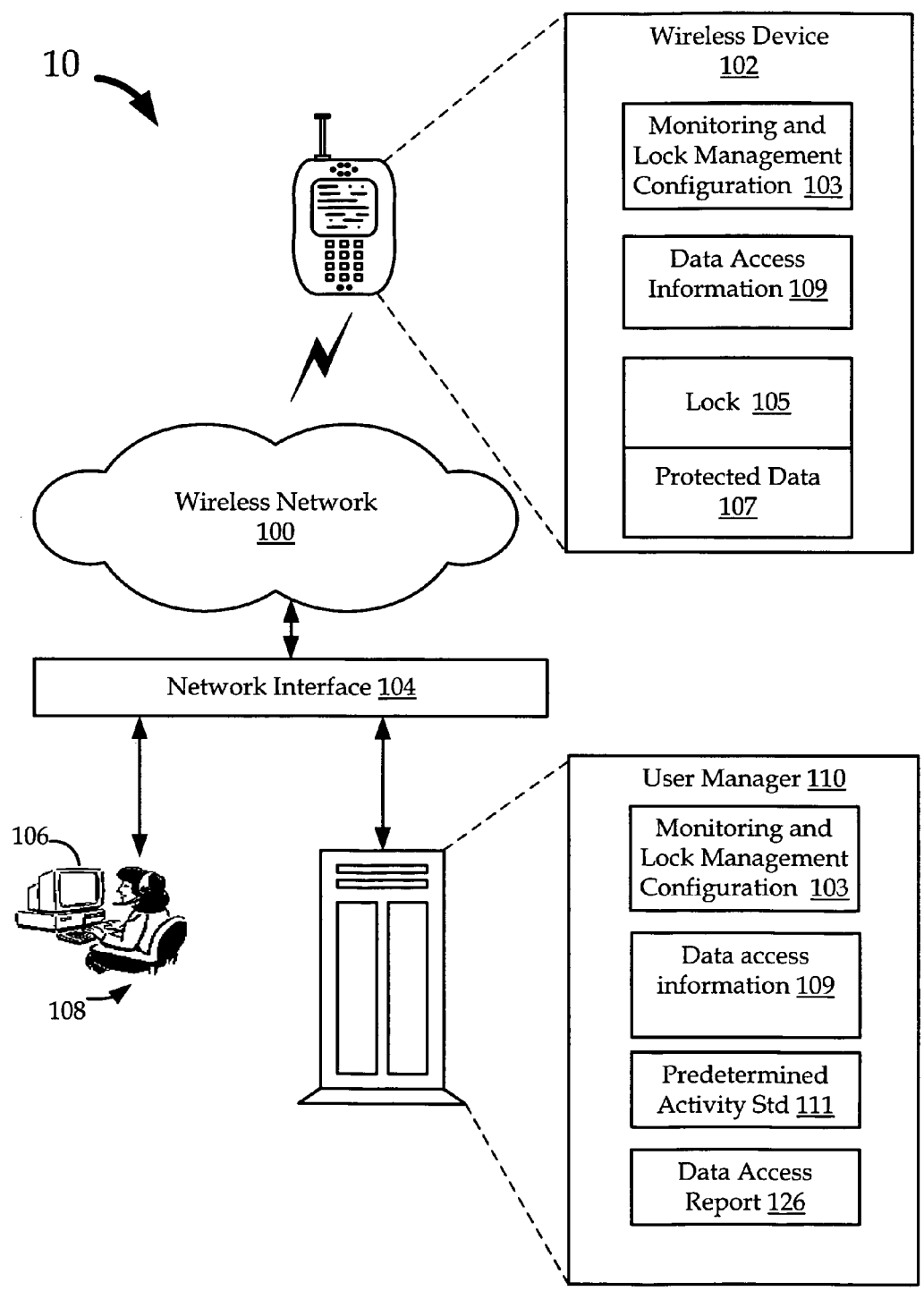
FIG. 1 is a representative diagram of an aspect of a system for managing data access attempt of a wireless device.

Referring to FIG. 1, in some aspects, a programmable data monitoring and lock management system 10 includes a wireless device 102 operable to execute a flexible data monitoring and lock management configuration 103 for monitoring and recording attempts to access protected data 107 on wireless device 102. For example, protected data 107 may be network related or user related and may include, but is not limited to, one or any combination of: device operational and/or functional settings, such as service programming codes; at least portions of service provision code (SPC) and/or data on one or more modules including, but not limited to a subscriber identification module (SIM), a universal subscriber identification module (USIM), and a removable user identify module (RUIM). Other aspects may include protecting data stored in a personal information manager, e.g. names, addresses and telephone numbers. Programmable locks 105 may be configured to restrict access to any data, including, but not limited to a service programming lock (SPL).

Further, wireless device 102 may be operable, based on configuration 103, to collect and forward detected data access information 109 to a user manager computer 110 in communication with wireless device 102 via a network interface 104 and a wireless network 100. For example, data access information 109 may include, but is not limited to, changes in network settings or a predetermined behavior in regards to data access associated with one or any combination of: protected data experiencing an access attempt; the data and inputs associated with an access attempt; a protected data identifier and/or a prior value and/or a new value associated with any changes to the protected data based on a successful access attempt; a prior value and/or a new value of protected data; an identifier associated with a module attempting access to protected data; an identifier, such as a subscriber identifier, associated with the respective wireless device; an identifier associated with a monitoring configuration responsible for the collected data access information; and any other information relating to any attempt to access and/or change a lock and/or protected data. Further, data access information 109 may include the date and time of the attempted access and information identifying the wireless device.

Further, in some aspects, user manager 110 may be operable to analyze data access information 109, based on one or more predetermined activity standards 111, and generate a data access report 126 that identifies and/or characterizes the data access attempt and may determine whether the access is, or is not, authorized. For example, predetermined standards 111 may include, but are not limited to, one or any combination of rules associated with what protected data is accessed, how many access attempts are allowed, and identification of authorized and/or unauthorized entities.

Additionally, system 10 may include a workstation computer 106, which may be operated by a user 108, in communication with user manager 110 via network interface 104. Workstation 106 may be operable to receive, retrieve and/or otherwise access data access information 109 and/or the data access report 126 and take appropriate action, either via user inputs or via predetermined rules, to manage, e.g., apply, remove, or change, one or more data access restricting locks 105 on wireless device 102 based on the identification and/or characterization of data access information 109. For example, user 108 may issue commands to change lock characteristics, for example to enhance security when report 126 indicates unauthorized access attempts. In another example, commands may be operable to change protected data and/or a functionality of wireless device 102, for example, such as to disable one or more functionalities of wireless device 102 when report 126 indicates that protected data 107 has been tampered with and/or changed.

Thus, system 100 is operable to monitor and record protected data-related information 109 on a wireless device 102 and transmit the information 109 to a user manager 110 that may reside on a remote device. Aspects of system 100 may include the user manager 110 analyzing the stored information, generating data access report 126, and transmitting, or providing access to, the report 126 to an authorized user 108. In addition, any of the wireless device 102, the user manager 110, and an authorized user 108 may be configured to generate control commands that may be operable to apply, remove, and modify an operation restricting lock on the wireless device 12 if the wireless device is so configured.

Figure 2:
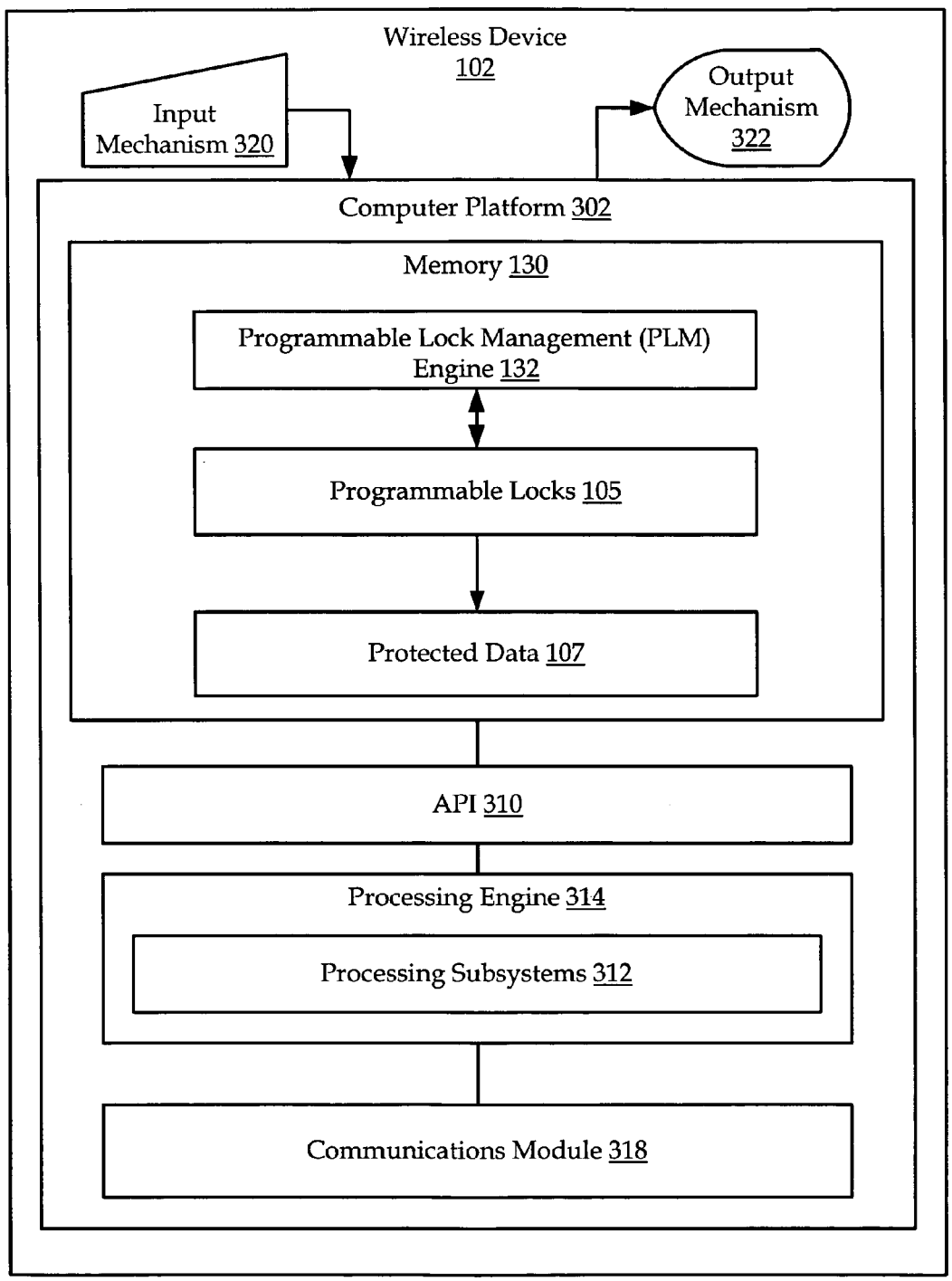
FIG. 2 is a block diagram of an aspect of a wireless device according to the system of FIG. 1.

Referring to FIG. 2, wireless device 102 may include any type of computerized, wireless device, such as cellular telephone 102, personal digital assistant, two-way text pager, portable computer, and even a separate computer platform that has a wireless communications portal, and which also may have a wired connection to a network or the Internet.

In addition, wireless device 102 may comprise a computer platform 302 interconnected with an input mechanism 320 and an output mechanism 322 respectively providing inputs and outputs for communicating with resident applications.

For example, input mechanism 320 may include, but is not limited to, a mechanism such as a key or keyboard, a mouse, a touch-screen display, and a voice recognition module. Output mechanism 322 may include, but is not limited to, a display, an audio speaker, and a haptic feedback mechanism.

Computer platform 302 may further include a communications module 318 embodied in one or any combination of hardware, software, firmware, executable instructions and data operable to receive and/or to transmit and otherwise enable communication between components within the wireless device 102, as well as to enable both hardwired communications and wireless communications external to wireless device 102.

For example, communications module 318 may include, but is not limited to, communication interface components such as a serial port, a universal serial bus (USB), a parallel port, and wired and/or air interface components for implementing communication protocols/standards such as World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Further, computer platform 302 may include a processing engine 314, which may be an application-specific integrated circuit (ASIC) or other chipset, processor, logic circuit, or other data processing device. Processing engine 314 is operable to execute an application programming interface (API) layer 310 that may interface with any resident programs, such as a programmable lock management (PLM) engine 132.

In one non-limiting aspect, API 310 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Additionally, processing engine 314 may include one or a combination of processing subsystems 312 that provide functionality to wireless device 102. In a cellular phone example, processing subsystems 312 may include subsystems such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. In other words, processing subsystems 312 may include any subsystem components that interact with applications executing on computer platform 302. For example, processing subsystems 312 may include any subsystem components that receive data reads and data writes from API 310 on behalf of any resident client application.

Further, computer platform 302 may also include a memory 130 for storing data, information, logic, executable instructions, etc. For example, memory 130 may comprise volatile and/or nonvolatile memory such as read-only and/or random-access memory (RAM and ROM), electronically programmable ROM (EPROM), electronically erasable programmable ROM (EEPROM), flash cards, or any memory common to computer platforms. Further, memory 130 may include one or more flash memory cells, and may further include any secondary and/or tertiary storage device, such as magnetic media, optical media, tape, or soft or hard disk.

Additionally, memory 130 may include one or more programmable locks 105 and one or more protected data 107. Lock 105 comprises one or any combination of hardware, software, firmware and/or other set of executable instructions, applied by PLM engine 132 and operable to limit access to a corresponding one or more predetermined protected data 107. For example, in some aspects, lock 105 may include a service programming lock (SPL) which protects certain types of service programming data, such as the account information stored in a subscriber identification module (SIM) which allows wireless device 102 to access a particular wireless network associated with a particular network service provider. Further, lock 105 may include an unlocking mechanism in order to gain access to, i.e. a reading or writing of a value of, protected data 107, and may require one or any combination of a predetermined key, a predetermined password, a predetermined digital certificate, and any other predetermined unlocking mechanism For example, lock 105 may be opened by inputting or providing the predetermined unlocking mechanism, which may be received by communications module 318 or entered via input mechanism 320 of wireless device 102, thereby permitting access to the protected data. Lock 105 may protect from unauthorized access one or any combination of protected data 107, including various types of data, such as SPCs, stored in one or any combination of modules, such as a SIM, a USIM, and a RUIM, and/or residing in any portion of memory 130, including but not limited to nonvolatile memory, e.g., ROM, EPROM, EEPROM, and flash cards; and volatile memory, e.g., random-access memory (RAM) or any memory common to computer platforms.

Additionally, memory 130 may further include PLM engine 132 operable to monitor, record, and report any attempt to access lock 105 and/or protected data 107. PLM engine 132 is programmable/configurable and may include one or any combination of hardware, software, firmware, executable instructions and data. In one aspect, PLM engine 132 may comprise PLM control logic 402 operable to manage all functions and components of the PLM engine 132. Further, because different versions of wireless devices may require different implementations, PLM engine 132 may include an engine identifier (ID) 404, such as a name, a version, etc., which is operable to identify the PLM engine 132.

Figure 3:
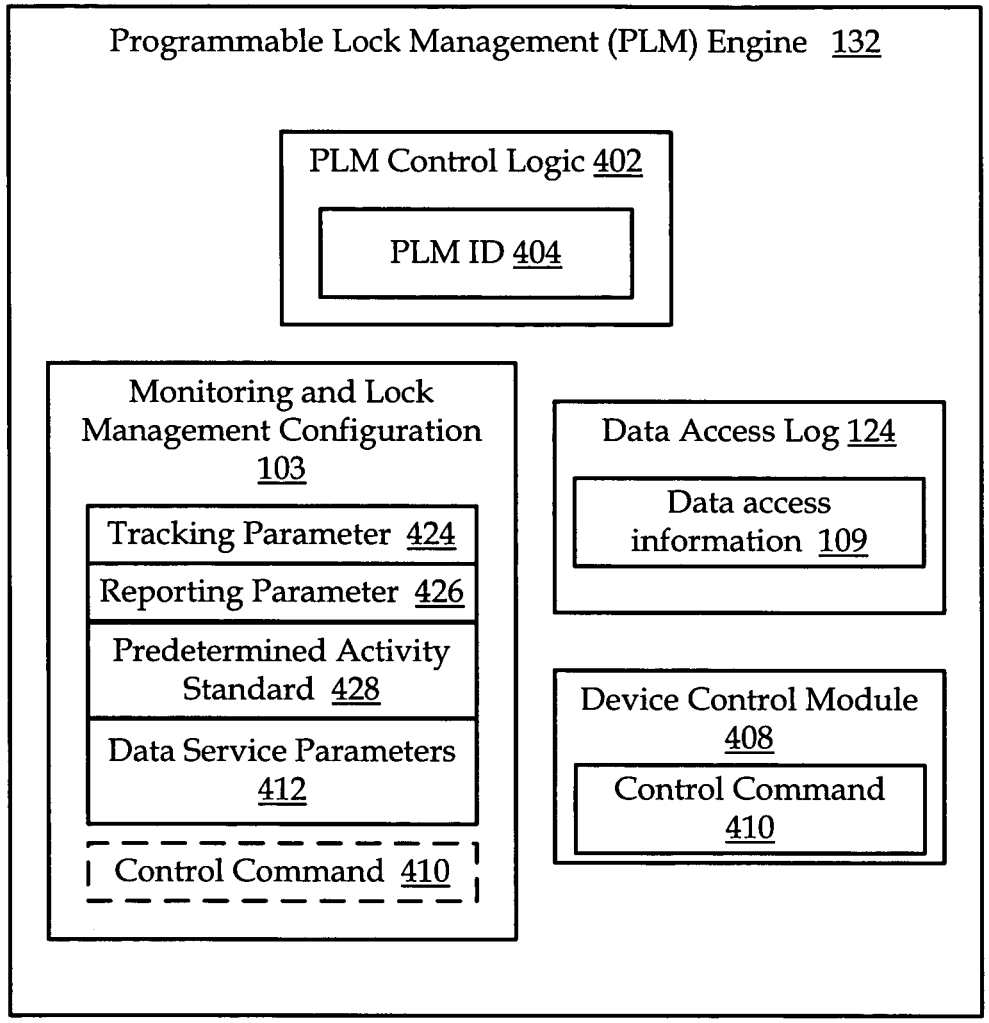
FIG. 3 is a schematic diagram of an aspect of a programmable lock management (PLM) engine of the wireless device of FIG. 2.

In particular, referring to FIG. 3, PLM engine 132 may be operable to execute configuration 103 to monitor and manage programmable locks 105 and/or protected data 107, and to report on data access information 109. As noted above, configuration 103 may be downloaded to memory 130 via wireless transmission over wireless network 100, statically installed at the time of manufacture, and downloaded via a hardwired connection to a personal computer (PC) or another computerized device. For example, configuration 103 may be configured by user 108 of workstation 106 and transmitted to wireless device 102 via user manager 110, where in some aspects user 108 is associated with a network service provider. Data access information 109 collected by PLM engine 132 may be stored, for example, in a data access log 124, which may comprise a plurality of lock activity records. For example, data access log 124 may be configured to include one or more records comprising multiple elements pertaining to the specific activity detected.

In some aspects, configuration 103 may include one or a combination of a tracking parameter 424 and a reporting parameter 426, which are utilized to monitor, record and report data access information 109.

Tracking parameter 424 may specify which protected data and/or locks to monitor, when, how often and what data access-activity-related information 109 to record. For example, tracking parameter 424 may specify by a name and/or code which locks 105 and/or protected data 107 of wireless device 102 to monitor, including various memory modules such as, but not limited to, a service programming code (SPC) module, a subscriber identification module (SIM), a universal subscriber identification module (USIM), and a removable user identity module (RUIM). Further, for example, tracking parameter 424 may include triggering events, such as access attempts, that initiate collecting of data access information 109. Additionally, for example, tracking parameter 424 may include one or any combination of a time interval, a number of input and response sequences and/or a triggering event, such as a predetermined activity and/or a predetermined time period of inactivity, which define how often to collect data access information 109. Further, tracking parameter 424 may identify one or any combination of inputs, responses, types of data, types of events, etc. which define what information to collect as data access information 109.

For example, data access information 109 may include data representing a sequence of inputs and responses may be logged whenever lock 105 is accessed or attempted to be unlocked, or whenever the value of protected data 107 is accessed or changed. Data access information 109 may include any type of data associated with any lock 105 and/or protected data 107 usage on wireless device 102. For example, data access information 109 comprises any information associated with access attempts and/or attacks on locks 105 and/or protected data 107, including, but not limited to, information such as: a time of an access attempt, a protected data identifier, an input relating to an access attempt, an access attempt result, a password, certificate or code used in an access attempt, a previous value and/or a new value of protected data 107, a previous and/or a new value of an unlocking mechanism associated with a lock 105, an identifier associated with a device and/or user attempting to access a lock 107 and/or protected data 107.

Reporting parameter 426 may define when and to whom, or to what address, and via what mechanism, to report out any collected data access information 109. For example, in some aspects, reporting parameter 426 may configure PLM engine 132 to selectively transmit data access information 109 and/or activity log 124 to user manager 110 across wireless network 100. Such a transmission may occur at any time, including but not limited to, at a predetermined time and/or on a predetermined interval, and on an occurrence of a predetermined event, such as: upon detection of an attempt to unlock a lock configured for monitoring or an attempt to directly access protected data; upon request by an authorized remote device, such as user manager 110 or workstation computer 106; and, upon the amount of collected data access information 109 reaching a certain memory size and/or upon wireless device 102 reaching a predetermined percentage of memory used and/or memory available. Further, reporting parameter 426 may determine whom to allow local access to data access information 109 and/or log 124, thereby allowing a remote device such as the user manager 110 to access memory 136.

For example, in one non-limiting aspect, data access log 124 may be transmitted to a predetermined party over an open communication connection between wireless device 102 and wireless network 100. For example, PLM engine 132 may "piggyback" data access log 124 onto an ongoing voice or data call across an open connection. Alternatively, in a cellular network configuration, PLM engine 132 may transmit data access log 124 to user manager 110 through short message service (SMS). Furthermore, as noted above, user manager 110 may "pull" log 124 from the wireless device 102 across the network 100 on a scheduled or ad hoc basis.

Further, in some aspects, configuration 103 may additionally include a predetermined activity standard 428 to identify an unauthorized data access attempt that has been configured for monitoring by operation of one or more tracking parameter 424 discussed above. For example, in some aspects, wireless device 102 may be configured to operate independently of user manager 110 and user 108 by analyzing the data stored in log 124 and automatically issue control command 410 to the wireless device 102, e.g., to disable the wireless device 102 except for certain emergency communications. For instance, PLM control logic 402 may be operable to apply predetermined activity standard 428 to information associated with accessing of lock 105 and/or protected data 107, and/or to data access information 109, to identify an unauthorized data access attempt, which may then trigger continued and/or additional information collection and/or which may trigger a control command 410, as will be discussed below. For example, certain types or numbers of access attempts may be allowed by one network carrier, but not allowed by other network carriers. As such, predetermined activity standard 428 allows each wireless device 102 to be configured as desired.

Optionally, in some aspects, PLM engine 132 may also include a wireless device control module 408 operable to receive and/or execute on wireless device 102 a locally or remotely generated control command 410. For example, device control module 408 may locally store one or more control commands 410 which may be triggered by predetermined events. Alternatively, or in addition, device control module 408 may be operable to receive control command 410 from user manager 110 via communications module 318. Control command 410 may be any instruction operable to alter one or more operational features of wireless device 102. For example, control command 410 may include, but is not limited to, commands such as instructing wireless device 102 to download configuration 103, uploading data access information 109, disabling all non-emergency functions, and enabling disabled functions.

For example, based upon an analysis of the uploaded data access information 109 identifying a number of unsuccessful attempts to access lock 105 and/or protected data 107, user manager 110 may transmit control command 410 to instruct wireless device 102 to disable some predetermined functionality, such as network communications. Subsequently, for example, user 108 of workstation 106 may, after communicating with the user of wireless device 102 that has been previously disabled, may issue a new control command 410 to enable any and all disabled functions.

Further, for example, in some aspects, when an access attempt is detected that appears to be unauthorized based on predetermined activity standard 428, PLM control logic 402 may notify device control module 408, which may automatically execute control command 410 to automatically disable wireless device 102. In one aspect, the reporting of executed control commands may be based upon reporting parameter 426. For example, the PLM engine 432 may report the executed control command 410 immediately to the user manager 110. In other embodiments, the wireless device 12 may report the control command executed, and the detected activity that triggered the command, at a later time as configured by the reporting parameter 426.

In the event of a control command executed on the wireless device limiting wireless device functionality, and generally at any time, user 108 of workstation 106, who may be a customer service representative of a network service provider, may be operable to contact the user of the wireless device 102 to discuss the detected data access attempt. Based upon that discussion, the workstation user 108 may transmit a command through the user manager 110 to enable the wireless device 102, or in other situations, further restrict wireless device operations.

Additionally, in some aspects, device control module 408 may request verification of a control command 410 received from a remote device, e.g., user manager 110 and workstation computer 106, before executing the command. For example, verification may occur by determining whether the issuer of the control command is authorized to issue control commands, and/or whether the issuer is authorized to issue the particular type of control command. The verification process may include any type of verification and/or authorization mechanism, such as digital keys, digital certificates, passwords, checking of issuer identification versus an approved list, etc.

Optionally, in some aspects, PLM engine 132 may further establish a limited-access communications channel across the wireless network 100 generally not available to the user of wireless device 102. For example, the limited-access communications channel may be used for transmitting data access information 109, data access log 124, receiving configuration 103, as well as for receiving/generating control command 410.

The identification and set-up of the limited-access communications channel may be based on at least one data service parameter 412. A data service parameter 412 may identify the type of communications that are allowed, and may identify the associated communication channels that can be utilized. Data service parameter 412 may be received over the wireless network 100 as part of monitoring and lock management configuration 103, may be locally transferred to wireless device 102, such as through a serial connection, or may be preloaded on the wireless device 102.

Referring back to FIG. 1, user manager 110 may be a server, personal computer, mini computer, mainframe computer, or any computing device operable to perform at least one or any combination of: generating configuration 103, receiving data access information 109 based on configuration 103, analyzing information 109, and taking proactive measures with respect to locks 105 and/or protected data 107 on wireless device 102 based on the analysis of information 109. In some aspects, user manager 110 may operate in conjunction with workstation computer 106 and workstation user 108 to perform these functions.

Furthermore, there may be separate servers or computer devices associated with user manager 110 working in concert to provide data in usable formats to parties, and/or provide a separate layer of control in the data flow between wireless device 102 and user manager 110. Further, user manager 110 may send software agents or applications to wireless device 102 across wireless network 100, such that the wireless device 102 returns information from its resident applications and subsystems 312. Furthermore, data manager module 120 may download all or a portion of the resident version of data manager module 120 to each wireless device 102. For example, data manager module 120 may initiate the transfer of PLM engine 132 (FIG. 3) to a respective wireless device 102.

Figure 4:
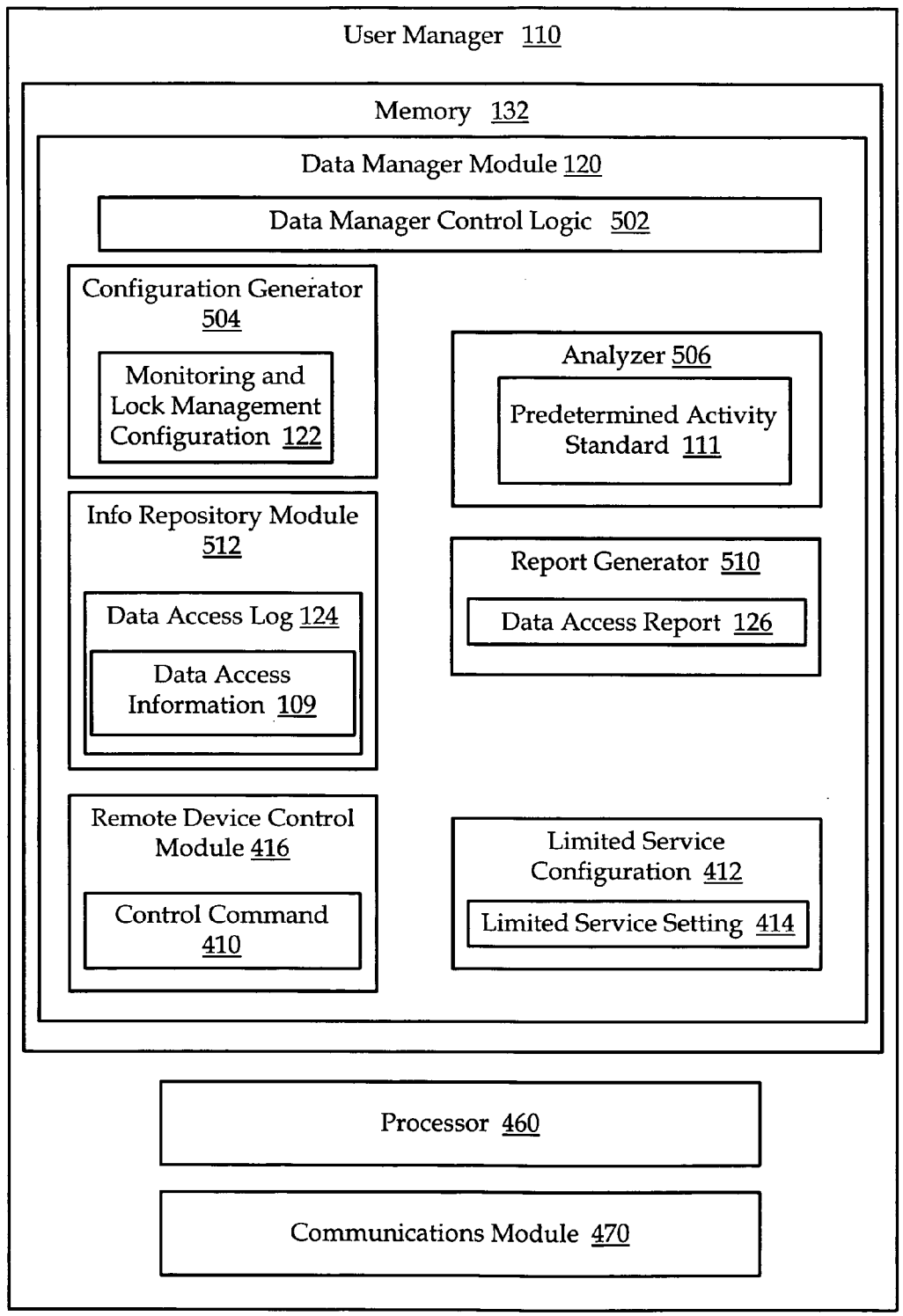
FIG. 4 is a block diagram of an aspect of a user manager of FIG. 1.

Referring to FIG. 4, user manager 110 may include a memory 450 operable to store data and executable instructions, a processor 460 operable to execute the instructions and data, and a communications module 470 operable to relay communications within the components of user manager 110 and between user manager 110 and external devices.

Additionally, user manager 110 may comprise a data manager module 120 operable to manage all operations regarding the management of lock 105 and/or protected data 107 on wireless device 102. Data manager module 120 may include one or any combination of hardware, software, firmware, data and executable instructions. In some aspects, data manager module 120 may include lock manager control logic 502 operable to control the functionality of data manager module 120.

In some aspects, data manager module 120 may include a configuration generator 504 operable to generate configuration 103 for monitoring lock 105 and/or protected data 107 on wireless device 102.

Figure 5:
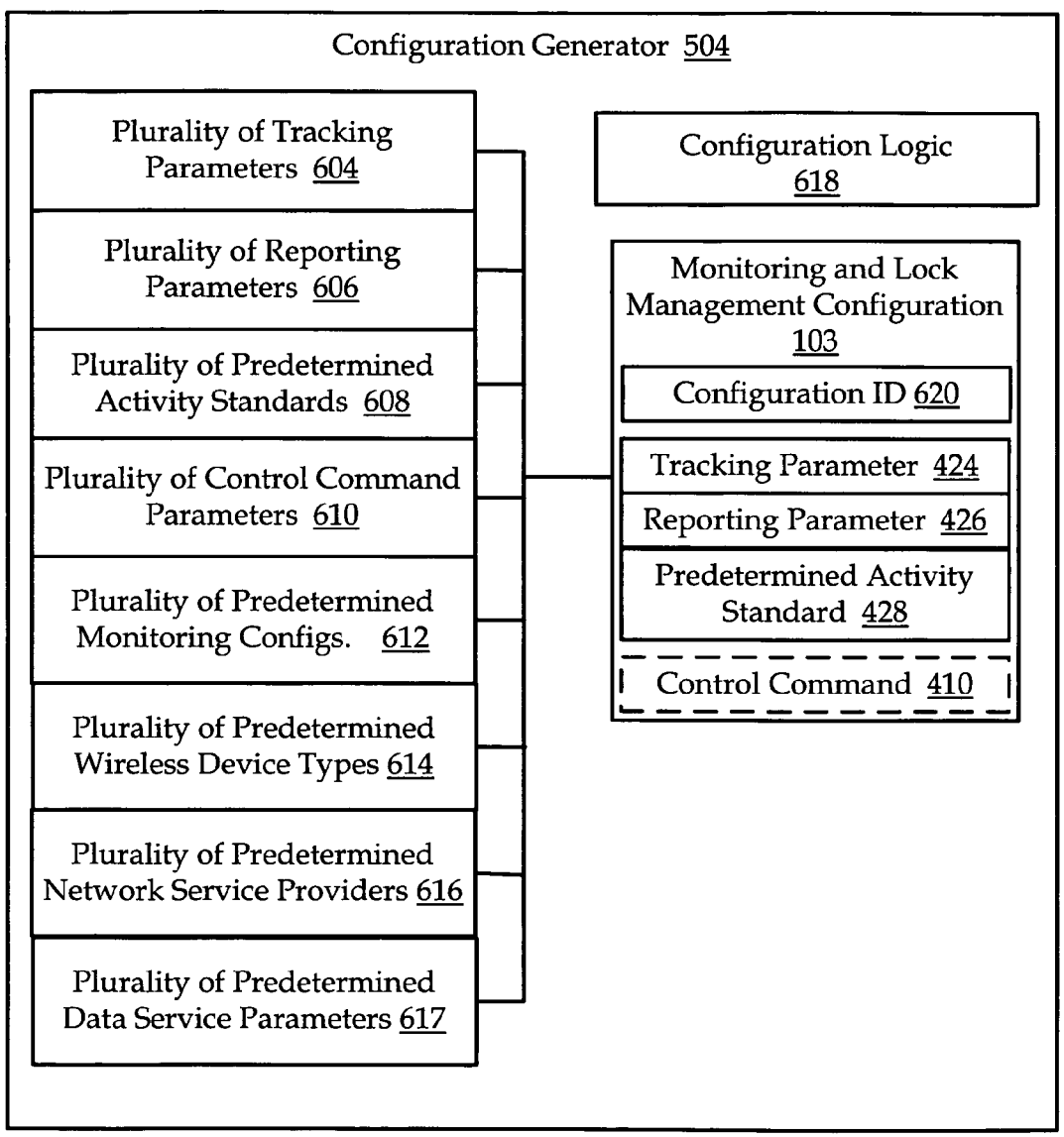
FIG. 5 is a block diagram of an aspect of a configuration generator of the user manager of FIG. 4.

Referring to FIG. 5, in some aspects, for example, configuration generator 504 may comprise configuration logic 618 operable to provide a user with the ability to select from a plurality of parameters to define configuration 103. For example, in some aspects, configuration 103 may comprise, but is not limited to, one or any combination of one or more parameters selected from: a plurality of tracking parameters 604; a plurality of reporting parameters 606; a plurality of predetermined activity standards 608; a plurality of control command parameters 610; a plurality of predetermined monitoring configurations 612; a plurality of predetermined wireless device types 614; and a plurality of network service providers 616.

Each of the plurality of tracking parameters 604 may define different tracking capabilities. As such, a selection of one of the plurality of tracking parameters 604, defined as tracking parameter 424 (FIG. 3), thereby defines a desired tracking capability.

Each of the plurality of reporting parameters 606 may define different reporting capabilities. As such, a selection of one of the plurality of reporting parameters 606, defined as reporting parameter 426 (FIG. 3), thereby defines a desired reporting capability.

Each of the plurality of predetermined activity standards 608 may define different allowable access-related behaviors, such as sequences of inputs to lock 105, access attempts by one entity or in a certain time period, etc. As such, a selection of one of the plurality of predetermined activity standards 608, defined as predetermined activity standard 428 (FIG. 3), thereby selects a specific activity behavior and/or capability to use when analyzing data access attempt configured for monitoring by tracking parameter 424.

Each of the plurality of control command parameters 610 may define different control command capabilities. As such, a selection of one of the plurality of control command parameters 610, defined as control command 410 (FIG. 3), thereby defines a desired control capability.

Alternatively, rather than selecting the various configuration parameters individually, each of the plurality of predetermined monitoring configurations 612 may define different known combinations of the above-stated parameters. For example, there may be certain combinations of monitoring parameters that can be defined as a standard for performing certain actions on wireless device 102, and as such these standards may be saved and recalled rather than having to assemble configuration 103 from scratch in each instance. As such, a selection of one of the plurality of predetermined monitoring configurations 612 thereby defines configuration 103.

Additionally, in some aspects, each of the plurality of predetermined wireless device types 614 may define a different manufacturer, make and/or model of wireless device. Further, each of the plurality of predetermined wireless device types 614 may correspond to one of the plurality of predetermined monitoring configurations 612. For example, the presence of a given lock 105 and/or a given protected data 107 may be dependent upon the specific wireless device in operation. For instance, certain types of wireless devices may not include a RUIM and/or a USIM. In this case, since different types of wireless devices have different data modules, configuration 103 may be device-specific. Accordingly, configuration logic 618 may provide a user with the ability to select from a menu of a plurality of predetermined wireless device types 614.

Similarly, what may be considered as access attempt activities to monitor and record by one network service provider may not be considered relevant activities by another network service provider. For example, some network service providers may allow or require certain accessing activities, while other network service providers may desire to prohibit the same activities. Accordingly, configuration logic 618 may provide a user with the ability to select from a menu of a plurality of predetermined network service providers 616, each corresponding to a given one of the plurality of predetermined monitoring configurations 612. As such, different monitoring configurations 103 may be generated for different network providers to detect network-specific accessing activities to monitor and record. Accordingly, a device roaming from one network service provider to the next may receive a new monitoring configuration depending on the current network service provider.

Further, configuration generator 504 may be operable to define at least one data service parameter 412, selected from a plurality of data service parameters 617, operable to establish a limited-access communications channel across the wireless network 100 allowing the wireless device to transmit the information log 124 to, and receive control commands from, the user manager 110 or authorized user, and where the limited-access communications channel is not available to an end user of the wireless device 102. In another aspect, the data service parameter 412 may be received over the wireless network 100 or may be preloaded on the wireless device 102.

Additionally, in some aspects, once the specific parameters of a given configuration 103 are determined, configuration logic 618 may assign a unique configuration identifier (ID) 620 to the given configuration. Further, configuration logic 618 may be operable to store the given configuration in a library for later recall, such as among the plurality of predetermined monitoring configurations 612.

Further, in some aspects, configuration logic 618, and/or another component of data manager module 120, may be operable to initiate the transmission of configuration 103 to one or more wireless devices 102. In some aspects, for example, control command 410 may be transmitted to activate the transmitted configuration 103 on wireless device 102. In other embodiments, PLM engine 132 (FIG. 2) may be configured to activate the newly transmitted configuration 103 immediately upon download.

Referring back to FIG. 4, in some aspects, data manager module 120 may further comprise an information repository 512, such as any type of memory and/or storage device, for storing collected data. For example, data manager module 120 is executable by user manager 110 to manage the collection of data access information 109 and/or information logs 124 from wireless devices 102 and store the data in information repository 512. As noted above, data manager module 120 may be operable to "pull" data access information 109 and/or information logs 124 from wireless device 102 based on commands from a user, or the logs may be "pushed" from the respective devices at predetermined times or upon reaching predetermined memory/data storage levels or upon reaching predetermined conditions such as the value of a protected data on the wireless device 102 being changed.

In addition, data manager module 120 may be further operable to analyze the data access information 109 stored in data access log 124 and generate a data access report 126 based upon the analysis performed. For example, in some aspects, data manager module 120 may comprise an analyzer 506 operable to analyze and process data access information 109 and/or data access log 124 received from wireless device 102 and stored in information repository 512. Analyzer 506 may comprise one or any combination of hardware, software, firmware, data and executable instructions, including algorithms, fuzzy logic, heuristic routines, decision-making routines, statistical programs, etc. for analyzing and interpreting data in data access information 109 and/or data access log 124.

Additionally, analyzer 506 may further include one or a plurality of predetermined activity standards 508, which may define one or more activities, events, sequences of inputs, approved accessing entities, and unauthorized accessing entities. Analyzer 506 may be operable to execute the algorithms, etc. in combination with predetermined activity standard 111 in order to determine an access characteristic associated with the data of data access information 109 and/or data access log 124. Although illustrated as being associated with data manager module 120 and memory resident within user manager 110, analyzer 506 may be located anywhere in communication with wireless network 100, such as on workstation computer 106, another server connected to the network, on a wireless device 102, and etc.

More specifically, in some aspects, analyzer 506 may compare a selected portion of data access information 109 and/or data access log 124, such as the number of unsuccessful attempts to access protected data, to a selected portion of the predetermined standard 111, such as the maximum number of times a particular portion of protected data may be unsuccessful accessed before the access attempts should be characterized as an attempt to breach the security of the wireless device 102. Based upon this comparison, analyzer 506 may send a type of control command 410 PLM engine 132 of wireless device 102, for example, to disable some predetermined functionality of wireless device 102.

Furthermore, in some aspects, after performing an initial analysis on data access information 109 and/or data access log 124, analyzer 506 may initiate further communications with one or more wireless devices 102 to retrieve additional data access information 109. Analyzer 506 may continue to request information until a predetermined solution is achieved, i.e., until analyzer 506 determines there is enough collected information to characterize the data in the aggregated data access information 109 and/or data access log 124.

For example, although analyzer 506 may be configured, in some aspects, to immediately report to a predetermined user, i.e., workstation user 108, whenever there is an attempt to access lock 105 and/or protected data 107, in other aspects, data manager module 120 may be configured to notify workstation user 108 only after the analysis indicates actual access to a predetermined lock 105 and/or protected data 107. For instance, in order to minimize operator workload, prior to notifying workstation user 108, analyzer 506 may generate and forward a new configuration 103 to the wireless device 102, thereby gathering more information relating to lock 105 and protected data 107 within the respective wireless device 102 to determine if there is a security problem with the respective wireless device 102.

Furthermore, based upon the log 124 of one wireless device, the analyzer 506 may proactively poll other wireless devices 102 to determine whether other wireless devices 102 have had similar attacks on lock 105 and/or protected data 107. For example, such polling may detect a virus that, for example, only attempts a predetermined number of accesses on a lock 105 so as not to be detected on a single wireless device 102.

Furthermore, in some aspects, data manager module 120 may further include a report generator 510 operable to generate data access report 126, which presents the result of analyzer 506 and which may include all or a portion of the collected data access information 109. In some aspects, data manager module 120 may be operable to make data access report 126 available to a predetermined party, such as allowing remote access to report 126 through another device, such as workstation 106, and/or such as by generating and transmitting an electronic message, including at least portions of report 126, to another device, such as workstation computer 106. In another example, data manager module 120 may be operable to generate an E-mail comprising at least portions of the report 126 over a communication channel to a predetermined party, such as workstation computer 106. Further, for example, user manager 110 may present protected data-related information on a monitor or display device.

Thus, data manager module 120 and its corresponding components may provide a predetermined user with a ready view of protected data-related information collected from the wireless devices 102 based on configuration 103. User manager 110 may present report 126 in any form, such as tables, maps, graphics views, plaintext, interactive programs or web pages, or any other display or presentation of the data. Further, data manager module 120 may group unauthorized access activity based on one or more of tracking parameters 424 and any access related information stored in log 124.

Also, in some aspects, user manager 110 may change the configuration 103 and/or send a control command 410 to be run on the respective wireless device 102, e.g. to apply a lock 105 in order to disable wireless device 102, based on data access information 109 and/or information log 124, and/or based on report 126 generated by the analyzer 70. For example, in some situations, e.g., wherein protected data 107 of wireless device 102 has been breached after repeated attacks, data manager module 120 may be configured to automatically apply a lock 105 to disable the wireless device for non-emergency use, and then transmit a report 126 to the workstation user 108 that includes the actions taken.

Additionally, in some aspects, still referring to FIG. 4, data manager module 120 may further include a remote device control module 416 operable, by execution of control logic 502, to receive control command 410 from workstation computer 106 to be transmitted to wireless device 102. In some other embodiments, remote device control logic 416 may be configured to automatically generate and transmit control command 410 to wireless device 102 based upon a determination of analyzer 506.

Figure 6:
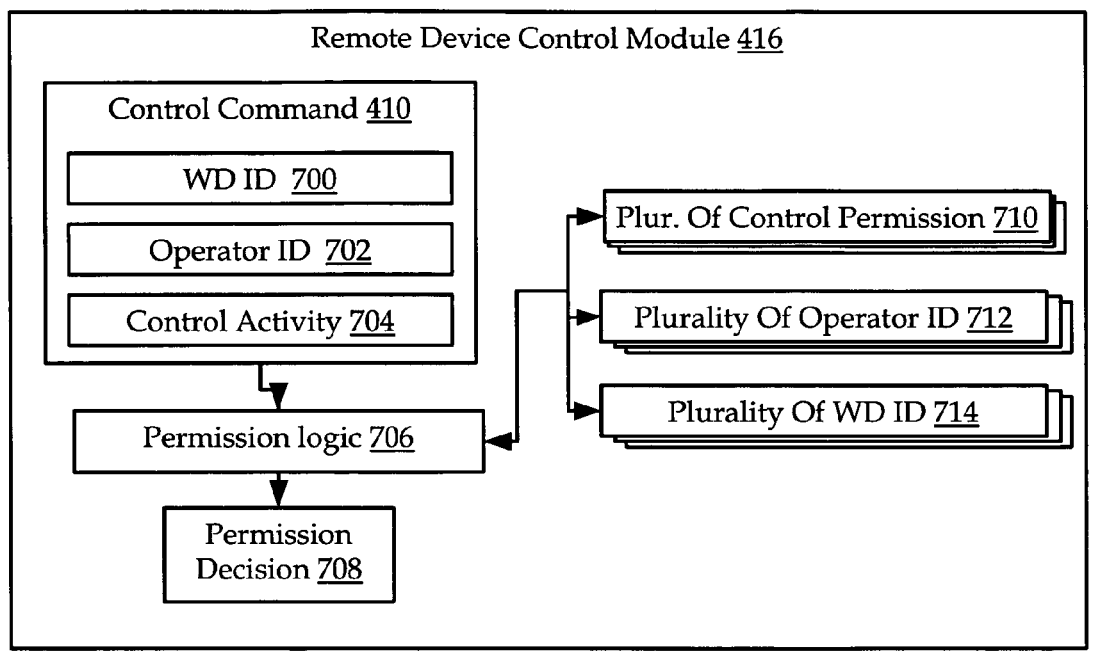
FIG. 6 is a block diagram of an aspect of a remote device control module of the user manager of FIG. 4.

Referring to FIG. 6, in some aspects, remote device control module 416 is operable under control of permission logic 706 to determine the validity of a received control command 410. Control command 410 may comprise a wireless device identifier (ID) 700, an operator identification ("ID") 702, and a control activity 704. The wireless ID 700 may be a SID or any unique identifier of the wireless device for which the control activity 704 is directed. The operator ID 702 may be some manner of identifying the originator of control command 410. For example, operator ID 702 may be a name, a number, a digital signature, a hash, or any other type of data or value that may be associated with an authorized user, e.g., workstation user 108. Further, operator ID 702 may not be explicitly contained in the control command 410, but rather may be derived from the origin of control command 410. Control activity 704 may be the operation to be performed on wireless device 102 by PLM engine 132 through executing control command 410. As mentioned above, the operation may include downloading configuration 103 and uploading data access information 109 and/or data access log 124. Thus, before executing or forwarding control command 410, device control module 416 may execute permission logic 706 to verify the authenticity or authority of the party issuing control command 410.

For instance, certain operators may be restricted to certain control activities, or restricted to controlling certain wireless devices. The authorization of control command 410 may simply be a prompt to workstation computer 106 to confirm whether the workstation user 108 actually wishes to execute control activity 704 on wireless device 102. Alternatively, permission logic 706 may parse operator ID 702 and control activity 704 from control command 410 and correlate these parameters with a database of a plurality of operator IDs 712, a plurality of control permissions 710 and a plurality of wireless device identifications (IDs) 714, in order to generate a permission decision 708 that is used by lock manager control logic 502 to control the transmission of the control command 410 to the wireless device 102.

It should be noted, however, that the plurality of operator IDs 712, the plurality of control permissions 710 and the plurality of wireless device identifications (IDs) 714 may be correlated in any manner. For example, control command 410 may contain an operator ID 702 and a control activity 704 that would "update monitoring configuration" for a particular one of the plurality of wireless device IDs 714. Permission logic 706 may search the database of control permissions 710 and operator IDs 712 to determine if the operator was permitted to "push" a new configuration on the given wireless device 102.

Figure 7:
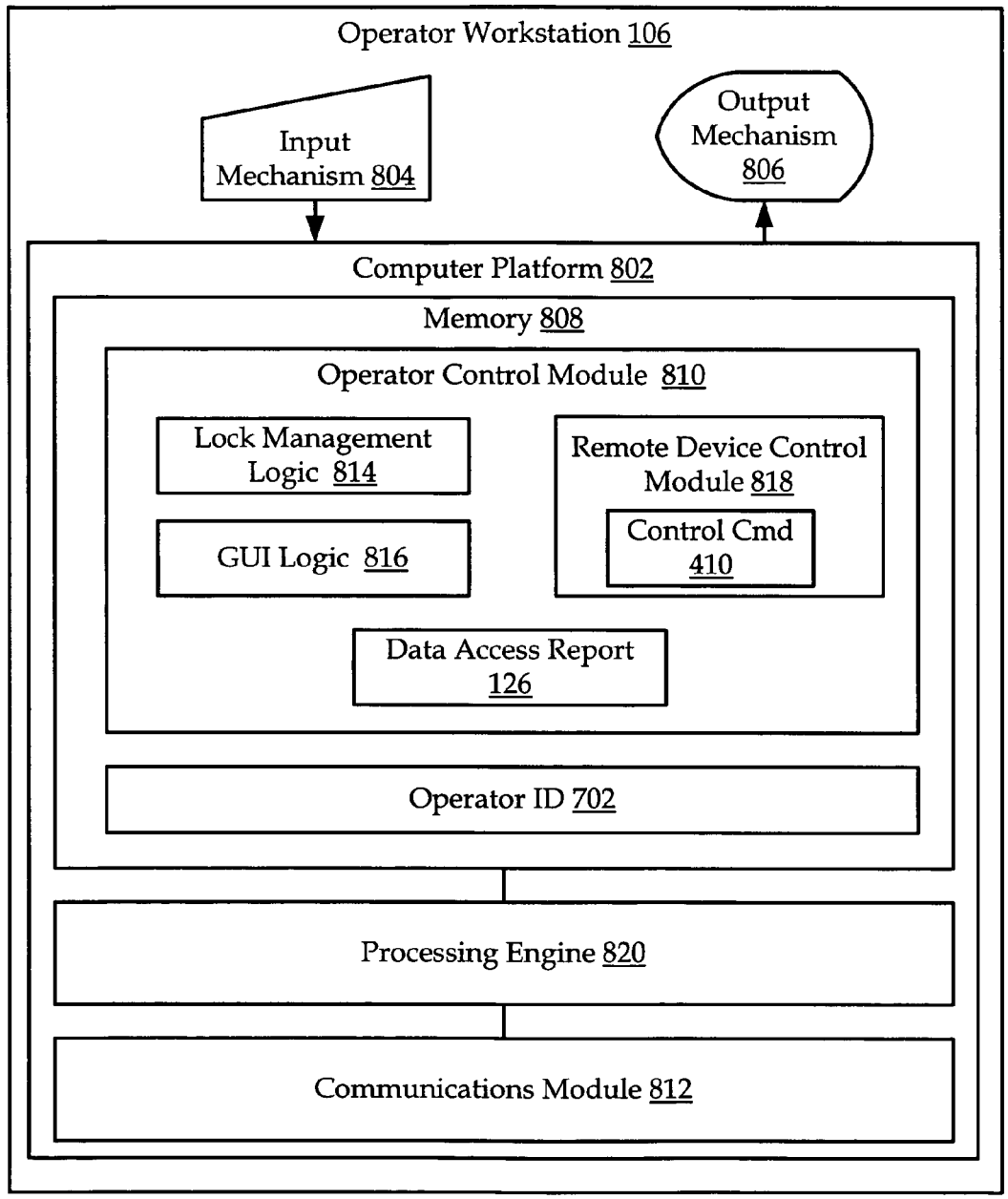
FIG. 7 is a block diagram of an aspect of an operator workstation of the system of FIG. 1.

Referring now to FIG. 7, workstation computer 106 may be operable to enable an authorized user, e.g., workstation user 108, to review data access report 126, communicate with a user of wireless device 102, download the PLM engine 132 and/or monitoring configuration file 103 to wireless device 102, and upload the data access log 124 from the wireless device 102. Furthermore, workstation user 108 may, via workstation computer 106, issue commands to the wireless device 102 that may, for example, be operable to apply at least one lock 105 to disable/enable at least portions of the functionality of the wireless device 102, and/or instructions to update configuration 103.

Workstation computer 106 may comprise an input mechanism 804, and an output mechanism 806 interconnected to a computer platform 802. The input mechanism 804 and the output mechanism 806 may be similar to their respective counterparts, 320 and 322, on wireless device 102.

The workstation computer 106 may further comprise a memory 808 for storing applications and data files, a processing engine 820 to execute the applications and process the data, and a communications module 812 operable to transmit and receive content between the workstation computer 106, the user manager 110, wireless device 102, as well as any network component on wireless network 100. Furthermore, the communications module 812 may be operable to transmit voice over the network 100, thereby allowing workstation user 108 to engage in voice communications with a wireless device user or other authorized personnel.

Memory 808 may further comprise an operator control module 810 made executable by processing engine 820. As the number of operator workstations 106 and the number of operators 108 are non-limiting, an operator ID parameter 702, previously discussed in reference to FIG. 6, may be stored into memory 808 and may be used to log on to the network 100 and identify that operator to network components.

The operator control module 810 may itself comprise lock management logic 814 operable in conjunction with Graphic User Interface (GUI) logic 816, input mechanism 804, and output mechanism 806, to guide the operator through an attack analysis and the selection and transmission of any control command 410. The GUI logic 816 may control, for example, browser communications, E-mail communication, text messaging, voice communication, report presentation, as well providing a menu for selecting and transmitting any control command 410 to the wireless device 102 through the user manager 110.

The operator control module 810 may further comprise a remote device control module 818 similar to the remote device control module 416 of the user manager 110 and may similarly generate a control command 410 operable on the wireless device 102 to perform a variety of activities, including, but not limited to: uploading data access log 124, and the forwarding of a network stored version of PLM engine 132 and/or configuration 103 to the wireless device 102.

Although the user of workstation computer 106 may normally be a person, e.g., workstation user 108, the workstation 106 may be a computing device comprising hardware, software, content, and combinations thereof for analyzing and responding to report 126 or to an external communication such as from the user of the wireless device 102. Such software may include algorithms, decision-making routines, statistical programs, etc. for analyzing and interpreting report 126. Further, as with the data manager module 120, the workstation computer 106 may reside on any network device of wireless network 100, such as on user manager 110, another server connected to the network, or even on a wireless device 102.

The workstation user 108 or other authorized user may generate a new configuration 103 or control command 410 such as disable wireless device for the respective wireless device 102 based on the information log 124 and/or on the report 126.

Additionally, in some aspects, the analysis performed by analyzer module 506 may also be performed all or in part by the workstation user 108 or user of the wireless device by manually reviewing the information log 124 and/or the report 126 and/or predetermined standard 111.

Referring back to FIG. 1, network interface 104 may be any mechanism that allows user manager 110 and workstation computer 106 to communicate across wireless network 100. For example, network interface 104 may include a local area network that connects user manager 110 through an Internet Service Provider to the Internet, which in turn may be connected to a respected wireless device through a carrier network and a base station.

Additionally, referring to FIG. 1, wireless network 100 includes any communications network operable, at least in part, for enabling wireless communications between a respective wireless device 102 and any other device connected to wireless network 100. Further, wireless network 100 may include all network components, and all connected devices that form the network.

For example, wireless network 100 may include at least one, or any combination, of: a cellular telephone network; a terrestrial telephone network; a satellite telephone network; an infrared network such as an Infrared Data Association ("IrDA")—based network; a short-range wireless network; a Bluetooth® technology network; a ZigBee® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.11 network; a public switched telephone network; a public heterogeneous communications network, such as the Internet; a private communications network; and land mobile radio network.

Suitable examples of telephone networks include at least one, or any combination, of analog and digital networks/technologies, such as: code division multiple access, wideband code division multiple access, universal mobile telecommunications system, advanced mobile phone service, time division multiple access, frequency division multiple access, orthogonal frequency division multiple access, global system for mobile communications, analog and digital satellite systems, and any other technologies/protocols that may be used in at least one of a wireless communications network and a data communications network.

Figure 8:
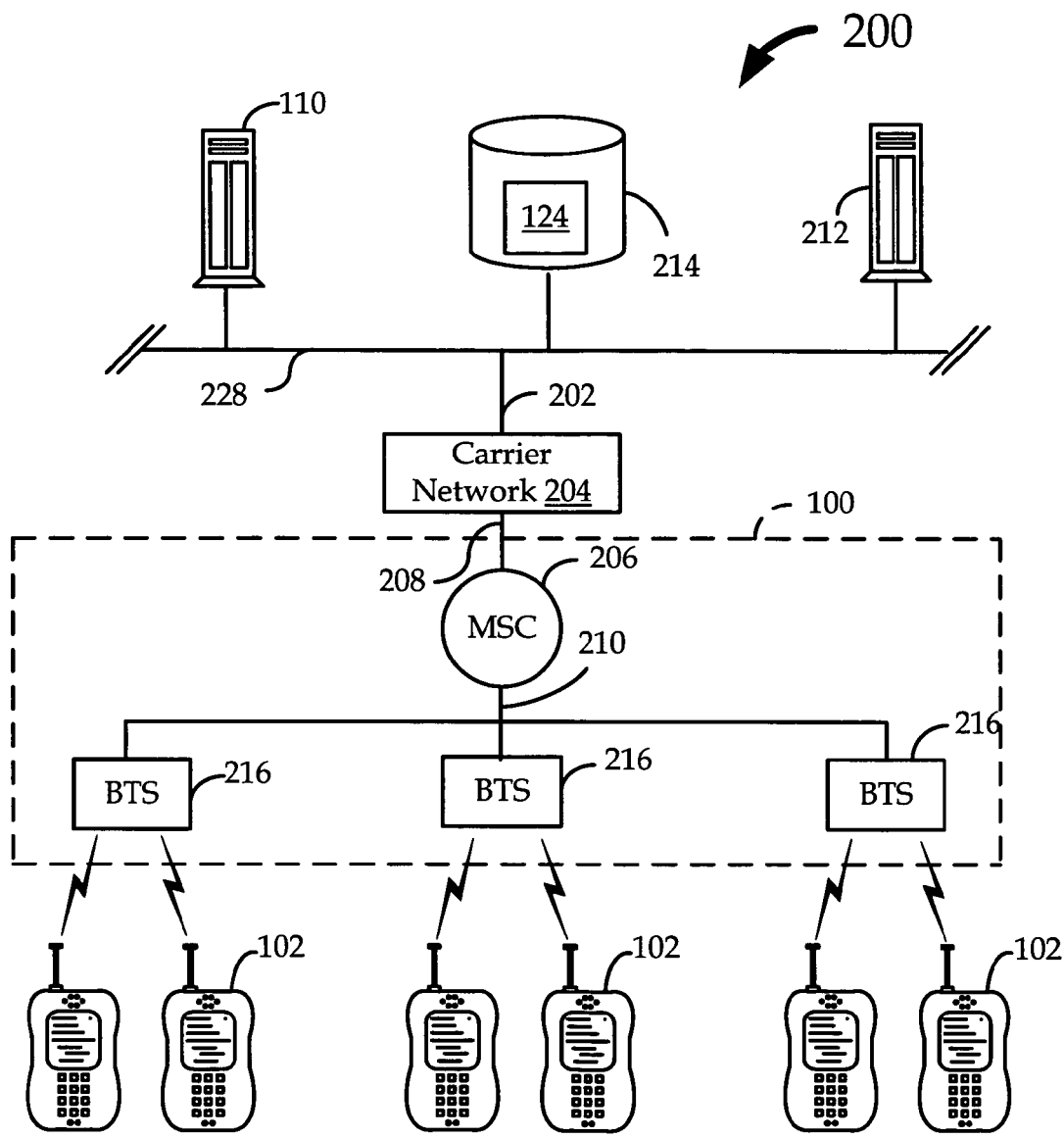
FIG. 8 is schematic diagram of an aspect of a cellular telephone network aspect of the system of FIG. 1.

Referring to FIG. 8, in some aspects, system 100 (FIG. 1) may be implemented within a cellular telephone system 200 including wireless network 100 connected to a wired network 228 via a carrier network 204.

In system 200, user manager 110 may be in communication over a LAN network 228 with a separate data repository 214 for storing the protected data-related information gathered from one or more remote wireless devices 102, i.e., the respective data access log 124. Further, a data management server 212 may be in communication with user manager 110 to provide post-processing capabilities, data flow control, etc. User manager 110, data repository 214 and data management server 212 may be present on the cellular network 200 with any other network components that are needed to provide cellular telecommunication services.

User manager 110, and/or data management server 212 communicate with carrier network 204 through a data link 202, such as the Internet, a secure LAN, WAN, or other network. Carrier network 204 controls messages (generally being data packets) sent to a mobile switching center (MSC) 206. Further, carrier network 204 communicates with MSC 206 by a network 208, such as the Internet, and/or POTS ("plain old telephone service"). In some embodiments of network 208, a network or Internet portion transfers data, and the POTS portion transfers voice information.

MSC 206 may be connected to multiple base stations (BTS) 216 by another network 210, e.g., a data network and/or Internet portion for data transfer and a POTS portion for voice information. BTS 216 may ultimately broadcast messages wirelessly to the wireless devices, e.g., cellular telephones 102, by short messaging service (SMS), or other over-the-air methods.

Figure 9:
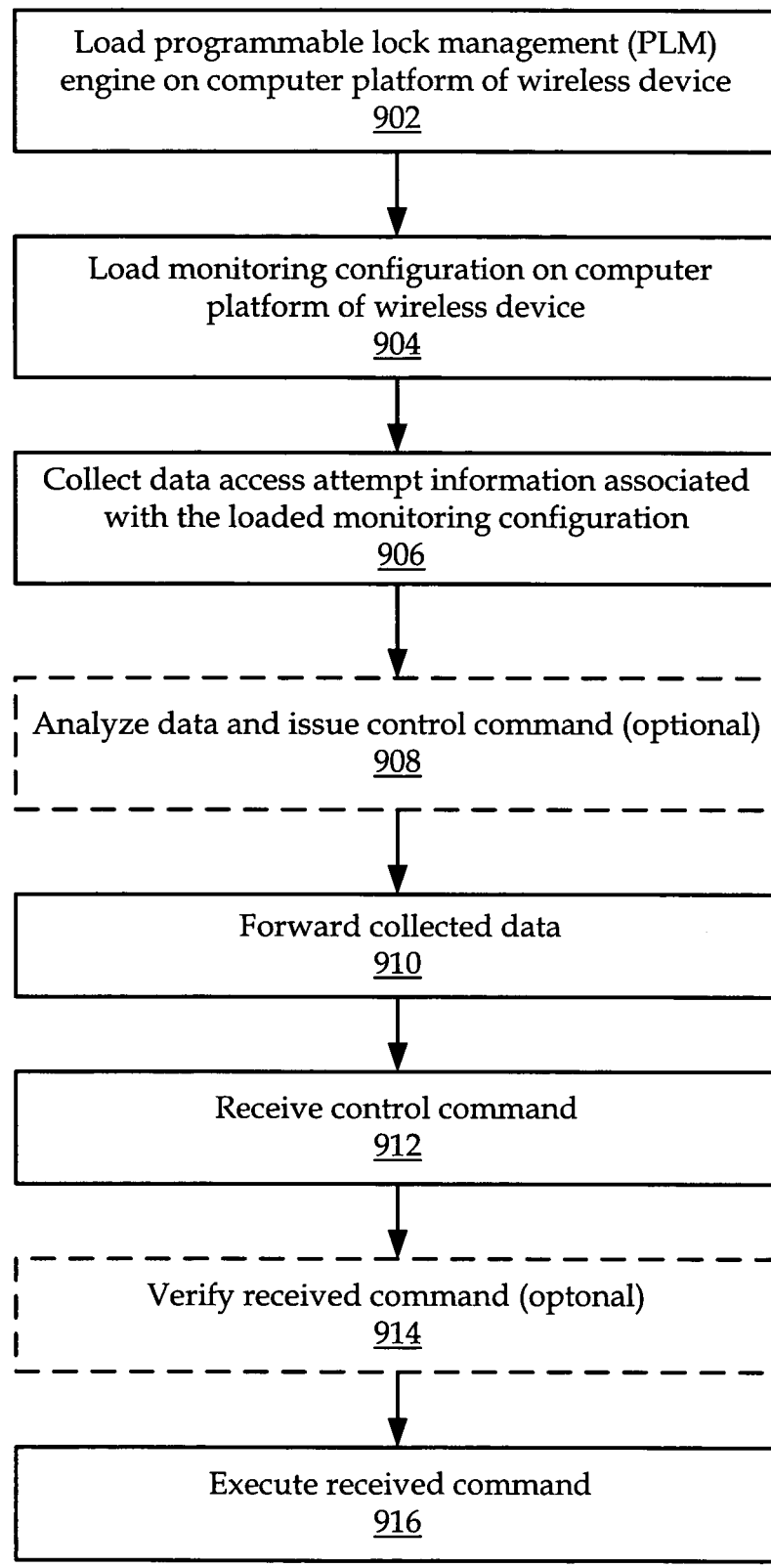
FIG. 9 is a flowchart of an aspect of a method of managing unauthorized access to protected data on a wireless device according to the system of FIG. 1.

Referring to FIG. 9, in some aspects, a method for managing data access attempt on a wireless device may include loading, at step 902, at least a portion of a PLM engine 132 onto a computer platform 302 of a wireless device 102. For example, the PLM engine 132 may be embodied within the hardware and/or firmware of the wireless device 102 during the manufacture of the device. Alternatively, the PLM engine 132 may be "pushed" by a user manager 110 to the wireless device 102, or "pulled" from a user manager 110 by the wireless device 102, across a wireless network 100.

Furthermore, the PLM engine 132 may be "pulled" or "pushed" depending on whether or not the wireless device 102 has the latest version of the PLM engine 132 for the respective wireless device 102. In another alternative, loading of the PLM engine 132 may be implemented as a result of one of several events, including, but not limited to a change in the value of protected data, activation of the wireless device 102, and a reported problem with data access attempt.

Further, at step 904, at least a portion of a configuration 103 may be loaded on the computer platform 302 of the wireless device 102. For example, the configuration 103 may be embodied within the hardware and/or firmware of the wireless device during the manufacture of the device. Alternatively, the configuration 103 may be loaded into memory 130 by means of a static connection to the wireless device 102, e.g., a hardwired connection to a PC.

Alternatively, the configuration 103 may be "pushed" by a user manager 110 to the wireless device 102, or "pulled" from a user manager 110 by the wireless device 102, across a wireless network 100. In another alternative, loading of the configuration 103 may be initiated in any manner, for example, being initiated by a predetermined event, such as a change to the SID. In another alternative, the pushing or pulling of the configuration 103 to the wireless device 102 may be configurable in any manner, for example, being initiated by a predetermined event, such as the activation of the wireless device 102, or being initiated by an event such as a technician receiving a report of a problem with data access attempt by the user of the wireless device 102, or by the user of the wireless device 102.

Further, at step 906, data access information may be collected from the processing engine 314 of the wireless device 102 in accordance with the configuration 103. For example, configuration 103 may dictate the storage of predetermined data access information from processing engine 314 and the appropriate subsystem 312 of the wireless device during its operation in information log 124.

For example, the wireless device may be configured, by appropriate settings of one or more tracking parameter 424, to log attempts by a wireless user to change carriers or to change the telephone number of the wireless device. In another aspect, the wireless device may log attempts by a user to activate unauthorized features of the wireless device.

Optionally, at step 908, PLM control logic 402 may compare the logged data access attempt with the predetermined activity standard 428 in order to determine if there has been an unauthorized attempt to gain access to lock 105 and/or protected data 107. Based upon the results of the comparison, the PLM engine 132 may request further information or issue a control command 410 to the wireless device processing engine 314 to disable one or more functions of the wireless device 102. Furthermore, there may be multiple levels of protection and standards by which the wireless device may, for example, just report a single attempt to access protected data, as opposed to disable wireless functionality based upon multiple attempts. Further, the wireless device may be configured to report certain logs immediately and report other logs during the normal course of operation. For example, a situation wherein a user has attempted to change their SIN five time over the course of a week, may not be sufficient to warrant transmitting an immediate notification to a user manager, whereas five attempts to change an SIN over a one hour time period may result in user manager notification.

Further, the PLM control logic 402 may be operable to log all executed control commands 410 and transmit the logged list of commands to a user manager or remote user based upon a reporting parameter 426.

Furthermore, either alternatively or in addition to automatically issuing a command 410, the PLM engine 132 may, at step 910, forward the collected data access information 109 and/or data access log 124 across the wireless network 100 to a network device, e.g., user manager 110. In one embodiment, the data access log 124 is uploaded from the wireless device 102 to user manager 110 in accordance with the configuration 103, such as through a standard HTTP, an FTP, or some other data transfer protocol. In another embodiment, a data service configuration 412 is used to upload the information log 124 across a channel that is not available to the user of the wireless device 102. In other embodiments, the information log 124 is uploaded from the wireless device using any communication means the wireless device 102 may access.

At step 912, wireless device 102 may receive a control command 410 transmitted from a remote device, i.e., unit manager 110. This command may be in response to an analysis performed on the transmitted data access log 124, and may be, in some embodiments, one or any combination of a request to the processing engine 314 to disable all non-emergency uses of the wireless device 102, to transmit additional information, and to receive a new configuration 103. Also, in some aspects, the command 410 may be received over a limited data channel based upon a data service parameter 412 as set in monitoring configuration 103.

At step 914, wireless device control module 408 may, in some embodiments, be operable to request verification of the source of the command 410 prior to it execution. Verification may comprise opening a communication channel with user manager 110 to verify the origin of the command 410.

Upon command verification, or upon reception of the command 410 (if verification is not required), processing engine 314 is operable to execute command 410. An acknowledgment may be transmitted back to the originating device indicating implementation of the command 410.

Figure 10:
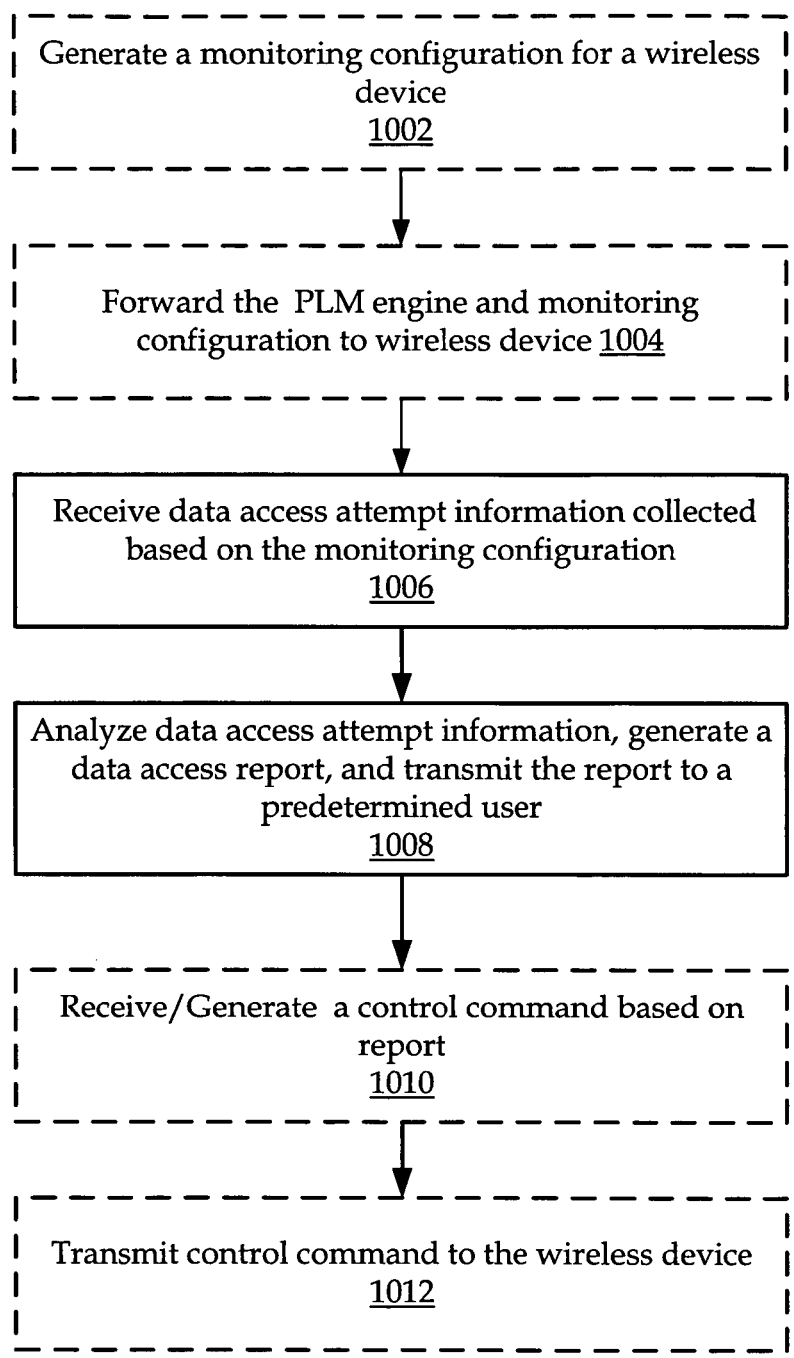
FIG. 10 is a flowchart of an aspect of a method of managing unauthorized access to protected data on a wireless device on a user manager according to the system of FIG. 1.

Referring to FIG. 10, in some aspects, a method whereby a user manager 110 manages programmable locks 105 and protected data 107 on a wireless device 102 may optionally include, at step 1002, generating a configuration 103 that may be downloaded to a wireless device 102 across a wireless network 100. For example, configuration 103 may be generated by operation of configuration generator 504 and/or some other portion of data manager module 120. The configuration 103 may set configurable parameters in the wireless device 102 that may be used to determine whether locks 105 and/or protected data 107 has, or is in danger of being, compromised.

After generating the monitoring configuration at step 1002, the user manager 110 may, at step 1004, optionally forward the configuration 103 to the wireless device 102 or to another network device responsible for forwarding the configuration 103 to the wireless device 102. In addition, the PLM engine 132 may not at this time be loaded onto the wireless device 102. Accordingly, prior to downloading configuration 103, the user manager 110 may download, or cause to be downloaded a version of the PLM engine to the memory 130 of the wireless device 102. The PLM engine 132, as well as the configuration 103 may be transmitted over a limited service data channel defined by data service parameter 412.

In some embodiments of the lock management system of FIG. 1, the user manager 110 is operable to wait until a wireless device 102 notifies the user manager 110 that data access information 109 and/or data access log 124 is ready to be uploaded. In other embodiments, the user manager 110 is operable to poll a wireless device 102, requesting the contents of data access log 124.

Regardless of whether data access information 109 and/or data access log 124 is "pushed" or "pulled," the data manager module 120 is operable, at step 1006, to receive from across a network 100 data access information 109 and/or data access log 124 from a wireless device 102 and store the data in an information repository module 512 that may be part of the user manager 110. Furthermore, data access information 109 and/or data access log 124 may be received either as a whole or in pieces and assembled by the user manager 110. Alternatively, information repository module 512 may be stored on any accessible network device.

Upon receipt of data access information 109 and/or data access log 124, data manager module 120 is operable, at step 1008, to generate a data access report 126 detailing at least portions of the data in data access information 109 and/or data access log 124. For example, report generator 510 may process multiple sets of data access information 109 and/or data access log 124 received from a plurality of wireless devices 102 and generate a composite report 126. For example, the composite report 126 may be based upon one or any combination of, for example, SID numbers, the activity being reported in each log 124, the lock for which the activity was detected, and the time of the activity. The report 126 or notification of the availability of the report 126 may be communicated to a predetermined network device, e.g., workstation computer 106, or an authorized user, e.g., workstation user 108. For example, the report 126 may be transmitted via electronic mail, or an authorized user may access the user manager 110, or repository of the report 126, to view the generated report.

In other embodiments, in order to minimize operator workload, the received data access information 109 and/or data access log 124 may be analyzed, for example by analyzer 506, prior to notifying an operator in order to determine whether a lock 105 or protected data 107 has been compromised or an attempt has been made to access restricted data on wireless device 102. For example, in some embodiments, analyzer 506 may comprise predetermined activity standards 508 for analyzing the information stored in data access information 109 and/or data access log 124.

Optionally, in some aspects, at step 1010, the user manger 110 may generate and/or receive a control command 410 based on report 126. For example, remote device control module 416 may be operable to generate control command 410 operable to disable all but emergency features of the wireless device 102. In the case of receiving the command, the control command 410 may be generated by another network device, e.g., workstation computer 106. Control command 410 may be intended for a particular wireless device 102 based on the corresponding data access report 126 produced based on the data access information 109 from that device. For example, the particular wireless device may be specified by wireless ID 700, e.g., a SID or other uniquely identifying feature. In some aspects, the authenticity and/or validity of control command 410 may be verified.

Optionally, in some aspects, data manager module 120 may be configured to transmit, at step 1012, control command 410 to the wireless device 102 based upon results of the analysis performed by analyzer 506. For example, remote device control module 416 may be operable to generate control command 410 operable to disable all but emergency features of the wireless device 102 and transmit the command 410 over a limited service communication channel based upon data service parameters 412 stored in monitoring configuration 103.

As noted above, the user manager 110 may be configured to determine the validity of the received command 410 prior to transmitting the control command 410. For example, a user manager resident remote device control module 416 is operable, based upon permission logic 706, a list comprising a plurality of controls 710, a list comprising a plurality of authorized operator IDs 712, and a list comprising a plurality of wireless device IDs 714, to determine a permission decision 708 that indicates the validity of the control command 410 as it pertains to the specific wireless device addressed in the command 410.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the operations, actions and/or steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, a computer readable medium having one or more respective sets of instructions corresponding to the above-described actions and/or steps, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure includes illustrative aspects, it should be noted that various changes and modifications could be made herein without departing from the scope of these described aspects as defined by the appended claims. Furthermore, although elements of the described aspects may be described or claimed in the singular, the plural is contemplated unless limitation to the singular is explicitly stated. Additionally, all or a portion of any aspect described above may be utilized with all or a portion of any other aspect, unless stated otherwise. Further, although specific terms are employed herein, they are used in a generic and descriptive sense only and not for purposes of strict limitation unless otherwise specified. Therefore, it is to be understood that the invention is not to be limited to the specific aspects disclosed and that modifications and other aspects are intended to be included within the scope of the appended claims.

What is claimed is:

1. A wireless communication device, comprising:
a memory comprising protected data and a monitoring and lock management configuration; and
a lock management engine resident in the memory and operable to
monitor protected data access attempts,
maintain a record of data access information, including access attempts to the protected data, based on execution of the monitoring and lock management configuration,
send the data access information including the access attempts to the protected data to an external predetermined device;
receive a control command from the external predetermined device in response to the data access information sent; and
restrict access to the protected data according to the monitoring and lock management configuration and the control command received from the external predetermined device, wherein the configuration comprises at least one predetermined tracking parameter and a predetermined activity standard, and wherein the lock management engine is operable to record the data access information based upon the at least one predetermined tracking parameter and to compare the predetermined activity standard to the recorded data access information to determine an authorized data access attempt.

2. The device of claim 1, wherein the configuration further comprises at least one of a tracking parameter, a reporting parameter, or a control command parameter.

3. The device of claim 1, wherein the access information comprises information relating to at least one of when protected data is accessed, a number of access attempts, an input entered during an access attempt, when protected data is changed, or a new content of the protected data.

4. The device of claim 1, wherein restricting access to the protected data includes modifying a security function that controls access to the protected data if the access attempts indicate repeated unsuccessful attempts to access the protected data.

5. The device of claim 1, wherein the configuration comprises a reporting parameter, wherein the lock management engine is operable to transmit the data access information to the external predetermined device for analysis based on the reporting parameter.

6. The device of claim 5, wherein the lock management engine is operable to transmit the data access information across a wireless network.

7. The device of claim 1, wherein the data access information comprises at least one of a subscriber identifier, a monitored lock identifier, a data access attempt, or a time associated with the data access attempt.

8. The device of claim 1, wherein the configuration further comprises at least one of a tracking parameter selected from a plurality of tracking parameters or a reporting parameter selected from a plurality of reporting parameters, wherein the tracking parameter identifies protected data to monitor and record, and wherein the reporting parameter identifies when to transmit the recorded data access information across a wireless network.

9. The device of claim 1, wherein the lock management engine is further operable to establish a limited-access communications channel across a wireless network and to transmit the data access information across the limited-access communications channel to the external predetermined device, wherein the limited-access communications channel is based on at least one predefined data service parameter.

10. The device of claim 9, wherein the limited-access communications channel is not available to an end user of the device.

11. The device of claim 1, further comprising a device control module operable to execute the control command to change an operational characteristic of the wireless device.

12. The device of claim 11, wherein the device control module is operable to receive the control command across a wireless network from the external predetermined device.

13. The device of claim 11, wherein the control command is selected from a group consisting of a disable command, an enable command, and a reconfigure command, wherein the disable command is operable to configure the wireless device non-operable for non-emergency communications, wherein the enable command is operable to configure the wireless device operational for communications, and wherein the reconfigure command is operable to set a protected data value.

14. The device of claim 11, wherein the device control module is operable to verify the control command before executing the control command.

15. The device of claim 14, wherein the control command comprises a user identification and a control activity, and wherein the device control module further comprises permission logic operable to determine an authorization for executing the control command based on at least one of the user identification or the control activity.

16. The device of claim 14, wherein the lock management engine is further operable to record information associated with an execution of the control command.

17. The device of claim 1, wherein the protected data comprises at least one of a subscriber identification module (SIM) data, a universal subscriber identification module (USIM) data, a removable user identify module (RUIM) data, or a service programming code (SPC) data.

18. A method operational in an external device for protecting data in a wireless device, comprising:
receiving data access information from a remote wireless device, based on execution of a monitoring and lock management configuration by the wireless device, the data access information including information associated with access attempts to protected data in the wireless device, wherein the configuration comprises at least one predetermined tracking parameter and a predetermined activity standard;
analyzing the received information associated with the access attempts to the protected data in the wireless device based upon the predetermined activity standard, including obtaining the data access information recorded based upon the at least one predetermined tracking parameter and comparing the predetermined activity standard to the recorded data access information to determine an authorized data access attempt; and
transmitting a control command to the wireless device, the control command operable to restrict access to the protected data in the wireless device based on the analysis by the external device of the information associated with the access attempts to the protected data.

19. The method of claim 18, further comprising:
generating a data access report based on the data access information and predetermined standards.

20. The method of claim 19, further comprising at least one of transmitting the generated data access report or providing access to the generated data access report to a predetermined entity.

21. The method of claim 20, further comprising receiving the control command from the predetermined entity based upon the data access report.

22. The method of claim 18, further comprising:
generating the monitoring and lock management configuration, which comprises at least one of a control command parameter, a tracking parameter, or a reporting parameter; and
forwarding the configuration to a wireless device across a wireless network.

23. The method of claim 18, wherein the control command modifies a security function that controls access to the protected data if the external device determines that the access attempts indicate repeated unsuccessful attempts to access the protected data.

24. A computer program resident in a non-transitory computer readable medium that, when executed, directs a computer device to perform the actions of:
receiving data access information from a remote wireless device, based on execution of a monitoring and lock management configuration by the wireless device, the data access information including information associated with access attempts to protected data in the wireless device, wherein the configuration comprises at least one predetermined tracking parameter and a predetermined activity standard;
analyzing the received information associated with access attempts to the protected data in the wireless device based upon the predetermined activity standard, including obtaining the data access information recorded based upon the at least one predetermined tracking parameter and comparing the predetermined activity standard to the recorded data access information to determine an authorized data access attempt; and
transmitting a control command to the wireless device, the control command operable to restrict access to the protected data in the wireless device based on the analysis of the information associated with access attempts to the protected data.

25. A data manager module, comprising:
means for receiving data access information from a remote wireless device, based on execution of a monitoring and lock management configuration by the wireless device, the data access information including information associated with access attempts to protected data in the wireless device, wherein the configuration comprises at least one predetermined tracking parameter and a predetermined activity standard;
means for analyzing the received information associated with access attempts to the protected data in the wireless device, based upon the predetermined activity standard, including means for obtaining the data access information recorded based upon the at least one predetermined tracking parameter and means for comparing the predetermined activity standard to the recorded data access information to determine an authorized data access attempt; and
means for transmitting a control command to the wireless device, the control command operable to restrict access to the protected data in the wireless device based on the analysis of the information associated with access attempts to the protected data.

26. A method of protecting data on a wireless device, comprising:
monitoring data access attempts to protected data in memory;
maintaining a record of data access information, including access attempts to the protected data, based on execution of a monitoring and lock management configuration, wherein the configuration comprises at least one predetermined tracking parameter and a predetermined activity standard, wherein maintaining a record of data access information includes recording the data access information based upon the at least one predetermined tracking parameter;
sending the data access information including the access attempts of the protected data in the memory to an external predetermined device;
receiving a control command from the external predetermined device in response to the data access information sent; and
restricting access to the protected data according to the monitoring and lock management configuration and the control command received from the external predetermined device, wherein restricting access to the protected data includes comparing the predetermined activity standard to the recorded data access information to determine an authorized data access attempt.

27. A wireless device, comprising:
means for monitoring data access attempts to protected data in memory;
means for maintaining a record of data access information, including access attempts to the protected data, based on execution of a monitoring and lock management configuration, wherein the configuration comprises at least one predetermined tracking parameter and a predetermined activity standard, wherein the means for maintaining a record of data access information includes means for recording the data access information based upon the at least one predetermined tracking parameter;
means for sending the data access information including the access attempts of the protected data in the memory to an external predetermined device;
means for receiving a control command from the external predetermined device in response to the data access information sent; and
means for restricting access to the protected data according to the monitoring and lock management configuration and the control command received from the external predetermined device, wherein the means for restricting access to the protected data includes means for comparing the predetermined activity standard to the recorded data access information to determine an authorized data access attempt.

28. A non-transitory computer readable medium comprising instructions operational in a wireless device, which when executed by a processor causes the processor to:
monitor data access attempts to protected data in memory;
maintain a record of data access information, including access attempts to the protected data, based on execution of a monitoring and lock management configuration, wherein the configuration comprises at least one predetermined tracking parameter and a predetermined activity standard and wherein maintaining a record of data access information includes recording the data access information based upon the at least one predetermined tracking parameter;

send the data access information including the access attempts of the protected data in the memory to an external predetermined device;

receive a control command from the external predetermined device in response to the data access information sent; and restrict access to the protected data according to the monitoring and lock management configuration and the control command received from an the external predetermined device, wherein restricting access to the protected data includes comparing the predetermined activity standard to the recorded data access information to determine an authorized data access attempt.

29. A wireless communication device, comprising:

a memory comprising protected data and a monitoring and lock management configuration; and a lock management engine resident in the memory and operable to monitor protected data access attempts, maintain a record of data access information, including access attempts to the protected data, based on execution of the monitoring and lock management configuration, send the data access information including the access attempts to the protected data to an external predetermined device;

receive a control command from the external predetermined device in response to the data access information sent; and restrict access to the protected data according to the monitoring and lock management configuration and the control command received from the external predetermined device, wherein the lock management engine is further operable to establish a limited-access communications channel across a wireless network and to transmit the data access information across the limited-access communications channel to the external predetermined device, wherein the limited-access communications channel is based on at least one predefined data service parameter and wherein the limited-access communications channel is not available to an end user of the wireless device.

30. A method of protecting data on a wireless device, comprising:

monitoring data access attempts to protected data in memory;

maintaining a record of data access information, including access attempts to the protected data, based on execution of a monitoring and lock management configuration;

establishing a limited-access communications channel across a wireless network to transmit the data access information across the limited-access communications channel to an external predetermined device, wherein the limited-access communications channel is based on at least one predefined data service parameter and wherein the limited-access communications channel is not available to an end user of the wireless device;

sending the data access information including the access attempts of the protected data in the memory to the external predetermined device using the limited-access communications channel;

receiving a control command from the external predetermined device in response to the data access information sent; and restricting access to the protected data according to the monitoring and lock management configuration and the control command received from the external predetermined device.

* * * * *